350-96.24
9/1/81    OR    4,286,839    SR

United States Patent [19]
Ilzig et al.

[11] 4,286,839
[45] Sep. 1, 1981

[54] LIGHT DIRECTING CONTROL SYSTEM, PARTICULARLY FOR MEDICAL OPERATING AND DIAGNOSTIC USE

[75] Inventors: Karl F. Ilzig, Hanau; Hans Scheidemann, Maintal, both of Fed. Rep. of Germany

[73] Assignee: Original Hanau Heraeus GmbH, Hanau, Fed. Rep. of Germany

[21] Appl. No.: 102,767

[22] Filed: Dec. 12, 1979

[30] Foreign Application Priority Data

Dec. 18, 1978 [DE] Fed. Rep. of Germany ....... 2854684

[51] Int. Cl.³ .............................................. G02B 5/14
[52] U.S. Cl. ............................ 350/96.24; 350/96.26; 350/96.32; 350/418; 362/32
[58] Field of Search ............... 350/96.26, 96.32, 96.24, 350/179; 362/32

[56] References Cited

U.S. PATENT DOCUMENTS

| | | | |
|---|---|---|---|
| 3,360,640 | 12/1967 | Seitz et al. | 350/96.24 |
| 3,437,803 | 4/1969 | Seitz et al. | 350/96.24 |
| 3,498,695 | 3/1970 | Brouwer | 350/179 |
| 3,786,243 | 1/1974 | Ilzig | 350/96.24 |
| 3,788,730 | 1/1974 | Greeleaf | 350/179 |
| 3,995,934 | 12/1976 | Nath | 350/96.26 |
| 4,045,119 | 8/1977 | Eastgate | 350/96.32 |
| 4,209,228 | 6/1980 | Chikima | 350/96.26 |

FOREIGN PATENT DOCUMENTS

| | | |
|---|---|---|
| 1197827 | 8/1965 | Fed. Rep. of Germany . |
| 2229683 | 2/1974 | Fed. Rep. of Germany . |
| 2352670 | 4/1975 | Fed. Rep. of Germany . |
| 2536738 | 12/1976 | Fed. Rep. of Germany . |

*Primary Examiner*—Stewart J. Levy
*Attorney, Agent, or Firm*—Frishauf, Holtz, Goodman & Woodward

[57] ABSTRACT

A light guide with a liquid light transmissive medium is connected to a variable pressure source, such as a controllable pump, and a hydraulic pressure take-off is connected to the light guide, for example adjacent the light exit window, to control the position of a positionable element, typically an optical system, such as a fluid lens, a movable lens, a diaphragm or the like, with respect to the exit light window from the light guide tube as a function of the pressure applied to the light transmitting liquid within the tube. Thus, the light guide can function simultaneously as a light guide and as a hydraulic servo pressure control element, to control the light output or the position of another element linked to the hydraulic servo positioning piston-cylinder arrangement coupled to the light transmitting fluid in the light guide.

15 Claims, 7 Drawing Figures

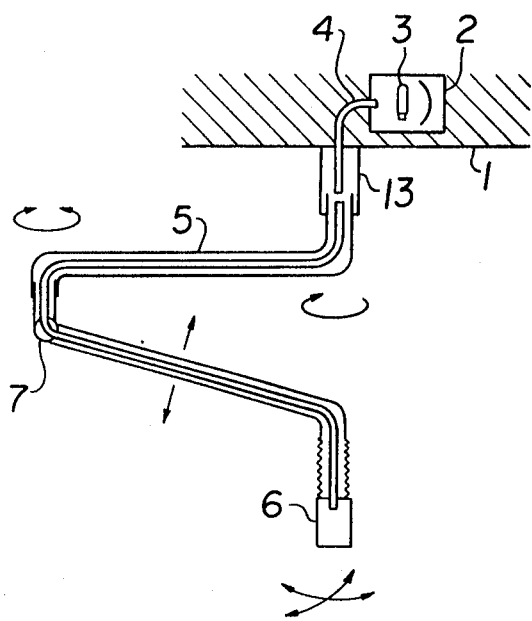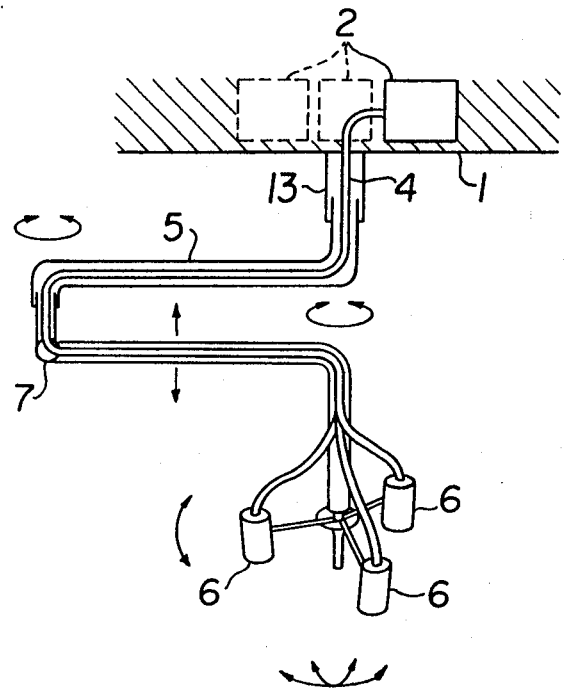
Fig.1a
Fig.1b
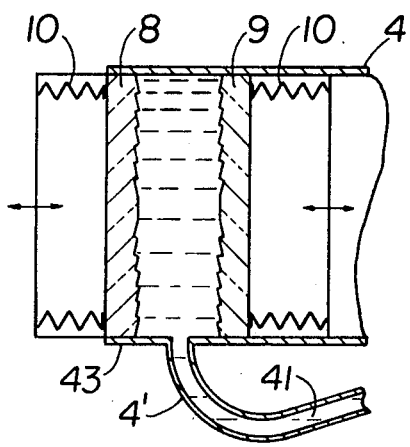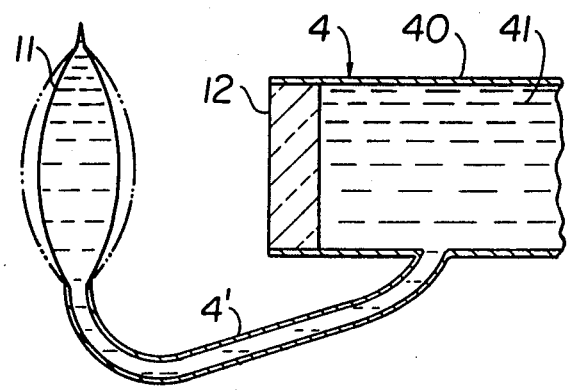
Fig.2a
Fig.2b

LIGHT DIRECTING CONTROL SYSTEM, PARTICULARLY FOR MEDICAL OPERATING AND DIAGNOSTIC USE

The present invention relates to a light directing and control system and more particularly to such a system using light guides to direct beamed light in operating rooms and the like.

Various types of light guides have been proposed in which a tube is closed off at both ends with a radiation permeable window, which is also liquid tight, the tube being filled with a fluid, typically a liquid having a high light transmission characteristic. Light guides of this type are described, for example, in U.S. Pat. No. 3,995,934, Nath. The liquid within the tube, that is, the liquid core, may be placed under pressure in order to prevent the formation of voids arising upon differential thermal expansion of the tube and the liquid therein due to different thermal coefficients—see U.S. Pat. Nos. 3,995,934, 3,786,243, 3,437,803, 3,437,804. The aforementioned U.S. Pat. No. 3,995,934, Nath, also shows a supply container for liquid which can be placed under pressure—for example by a gas under pressure which serves to keep constant the pressure acting on the liquid within the flexible tube, despite variations in temperature and the like, so that variations in density and transmission, which might reduce the light transmission, are avoided.

It is known to associate optical equipment such as lenses, diaphragms, controlled apertures, and the like, with the light exit opening. Control of such apparatus is frequently difficult since the physical space available for additional control equipment is limited.

The Invention

It is an object to provide a combined light guide—optical system, so that light emitted from a light guide can be controlled without introducing additional complex control apparatus.

Briefly, the liquid in a liquid light guide is used for a dual purpose: (1) to transmit light, and (2) to transmit fluid pressure, which is used to control an optical system. The hollow light guide is coupled to a light generation means and, at the region adjacent the exit opening, pressure sensing and transducing means are coupled to the liquid within the light guide itself, that is, the air and fluid communication with the light transmitting fluid within the tube. An optical system, such as lenses, apertures, and the like, is positioned adjacent the exit terminal of the tube, the optical system being controlled by pressure within the light transmitting fluid in accordance with the pressure sensed therein, and being controlled thereby. For example, the position of a lens with respect to other lenses, or the exit window of the tube can be shifted to change the field of light being emitted; apertures can be controlled to open and close, or the like.

The system has the advantage that the liquid light transmission medium which, primarily, is used to transmit light, can also and additionally be used as a pressure transducing element in order to provide directly operating force, under controlled conditions, to a controllable optical system. Response is instantaneous, and transmission of control and adjustment signals is possible over long distances in a simple manner. If the light guide itself is formed of a plurality of tubes having individual optical systems coupled with the opening, synchronous operation is readily obtained.

DRAWINGS

FIG. 1a is a highly schematic side view of a light guide—optical system secured through a ceiling of an operating room, and in light transmitting relation to a light source located in the ceiling;

FIG. 1b is a view similar to FIG. 1a and showing a multiple light guide system;

FIG. 2a is a highly enlarged schematic longitudinal sectional view through an end of the light guide with an exit window and an optical system which includes a liquid lens;

FIG. 2b shows a terminal end of a light guide with an exit window and an optical system with a lens of variable focal length;

Figure 2C:
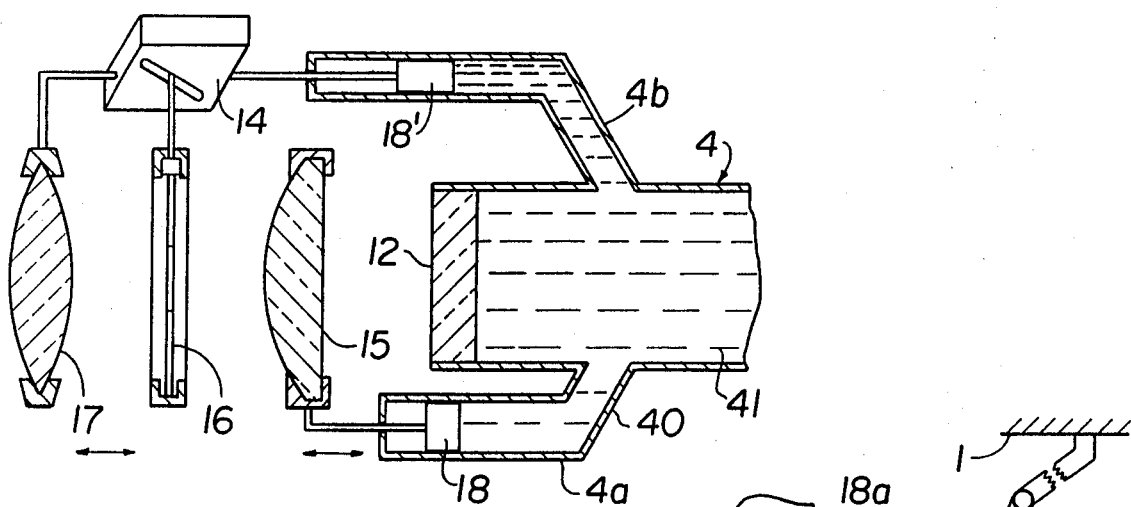
FIG. 2c is a highly schematic longitudinal sectional view through the exit portion of a light guide and shows an optical system which includes a variable aperture and a variable lens system, the position of which can be adjusted with respect to the exit window.

The ceiling 1 of an operating room (FIG. 1a) has a light source 3 located within an explosion-proof housing 2. The light is directed through suitable reflectors within the housing to an entrance window of the light guide 4. The light guide 4 is retained within the operating room in a housing 5, and guides light from the ceiling fixture 2,3 to an exit portion 6. The outer cover 5 can be formed as a flexible metal tube, conduit or the like, but, preferably, is a plastic tube of a material which can be sterilized. The end portion 6, preferably, has a terminal piece which is replaceable. One arrangement of such a light guide with an end light transmission opening is described in German Disclosure Document DE-OS 22 29 683. This disclosure describes an operating lamp with a light conducting element to focus light to a limited area of the operating field. The element consists of a light conducting cable with a core and an outside cover, capable of being bent into a desired shape, and connected to the light emitting end of a movable adjustable arm by means of an easily detachable connector. The connector is positioned at one end of the light conducting cable and an illuminating head is positioned at the other end thereof. The light guide can be coupled to a standard operating room light and receive light therefrom, rather than receiving light from a light emitting fixture located within the ceiling, as shown in FIG. 1a. The operating room light itself can be suspended from a support arm or stub 13 (FIG. 1a) in customary and well-known manner. The housing 5 can also consist—as desired, of a plurality of telescoping elements which are connected by one or more joints 7, permitting practically universal movement and adjustment, as schematically indicated in FIG. 1a by the double-pointed arrows.

The number of exit openings 6 which are coupled to the light guide can be selected in accordance with the requirements of the user; FIG. 1b shows an arrangement where a plurality of light exit tubes are coupled to the single light transmission tube 4, terminating in separate individual end pieces 6. The ceiling may have a plurality of light generating units 2 located therein, each one coupled to a separate outlet 6 for selective high-intensity illumination, or only a single unit 2 provided coupled to a single light guide 4 which then terminates in a plurality of exit units 6.

Various types of light guides use fibers for light transmission—see, for example, U.S. Pat. No. 3,360,640, Seitz et al, assigned to the assignee of the present application. The present invention is not directed to light guides of this type, but rather to light guides which use liquids, so that the light guide itself can have the dual function of transmitting control signals in the form of pressure variations while also transmitting light. Suitable liquids are well known, for example as described in the aforementioned U.S. Pat. No. 3,995,934, Nath. The liquid 41 (FIG. 2—collectively) is retained within opaque commercial plastic tubes 40. Typically, the tube is of a suitable type of Teflon.

FIG. 2a shows an arrangement in which the liquid light transmitting medium transfers pressure to a liquid lens. Two disks 8 and 9 have facing surfaces which are serrated or ridged to have light dispersion characteristics. They can be moved towards or away from each other by changing the pressure of the liquid 41 within the tube 4'. The elements 8,9 are returned to a central position by compression springs 10, a bellows arrangement or the like. Springs 10, for example spiral springs, permit movement of the disks 8,9 laterally, in the direction of the double arrows. Light emission at the end of the light guide 4 is changed in dependence on the pressure which is applied to the disks 8,9. The disks 8,9 are guided within an extension 43 of the tube 4, secured in a suitable housing (not shown) and against which the springs 10 can bear.

Another optical system is shown in FIG. 2b in which light emitted from a light exit window 12 is directed through a lens 11 which consists of liquid retained within a flexible lens element, filled with the same liquid 41 as the light guide 4. A branch connection 4' connects the light guide 4 to the lens 11. The exit window 12 is sealed to the light guide 4, to prevent leakage or emission of liquid, such as the seals of the disks 8,9 in FIG. 2a.

FIG. 2c illustrates a light guide end portion with two branches 4a,4b which are, each, connected to a piston arrangement 18,18'. The light guide 4, as in FIG. 2b, is closed off by a transparent window 12. The transmission of light from the window 12 can be changed by changing the relative position of lenses 15, or 17, with respect to the window 12, in dependence on pressure within the light guide 4. The light passes from the window 12 through a planar-convex lens 15, then through a variable diaphragm or aperture 16, and through a bi-convex lens 17. The aperture 16 and the position of the lens 17 can be changed together upon changing of the pressure within the tube 4, thus moving the pistons 18,18' within the respective cylinders formed by the tube extensions 4a,4b. Reset springs—not shown—and located, for example, within the end of the cylinder-housing, can be used to provide reset force to the respective pistons 18,18', as well known.

In operation, change of the pressure within the tube 4 will cause a shift in the optical relationship of the light emitted from the tube 4 as such; thus, light passing from the right through the tube 4 and then through the dispersion elements 8,9—positioned relative to each other in accordance with the pressure within the tube 4—will be scattered or dispersed; light emitted from the window 12 (FIG. 2b) can be focussed into a narrow or wider beam, and subjected to fine positioning by means of an aperture (FIG. 2c). Change in the pressure within the light guide 4 controls either a positioning system using a piston-cylinder arrangement (FIG. 2c) or directly changes the physical appearance, and hence the light transmission characteristics of an optical element within the path of light (FIG. 2a, FIG. 2b).

Figure 3:
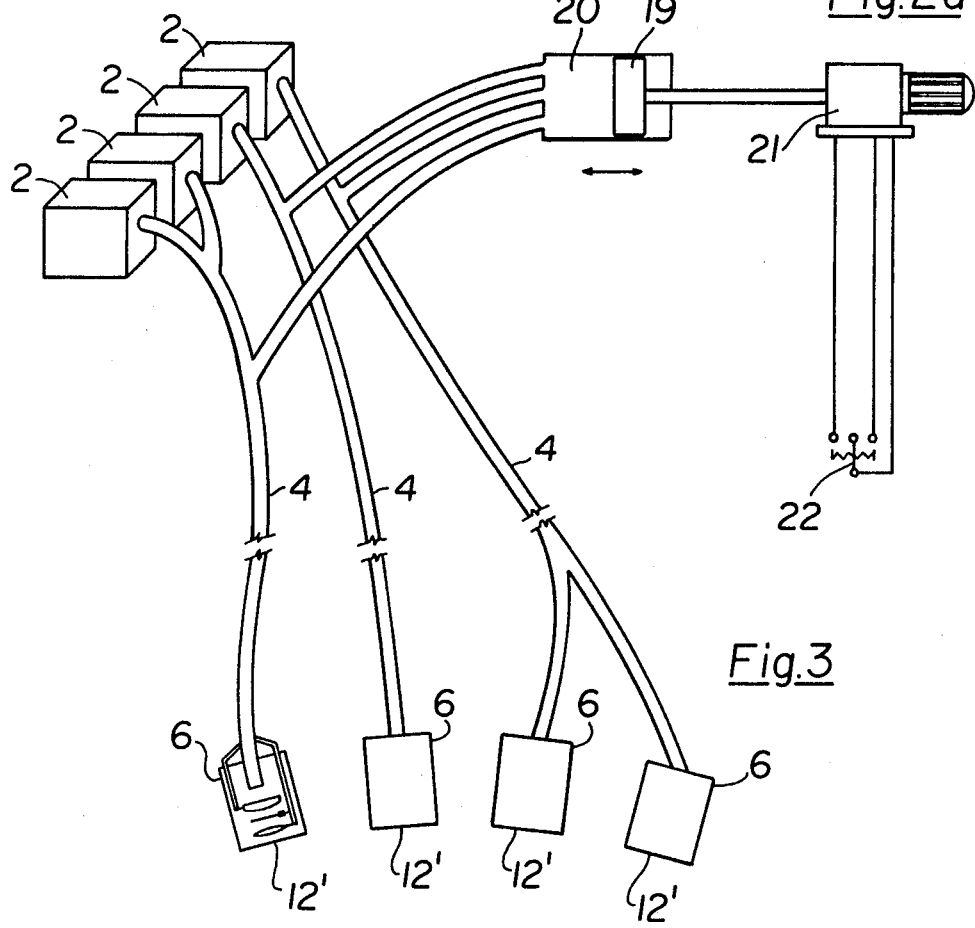
FIG. 3 is a highly schematic view showing a control arrangement to control a plurality of light guides for synchronous operation of the optical system adjacent the exit window.

FIG. 3 illustrates a light guide system with a plurality of light guides 4, coupled to respective separate light generators 2, in various selected arrangements, as shown at the left top-side of FIG. 3. As desired, one light generator may be coupled to a single light guide, another light generator can be coupled to a single light guide having a single optical terminal, or another light generator can be coupled to a light guide which branches to form two parallel-connected exit elements 6. The pressure within any one of the light guides can be controlled by a piston 19 operating within a cylinder 20 which is coupled to the respective light guides 4. The position of the piston is controlled by a positioning motor 21 in accordance with an operating switch 22, moving the pistion either towards the right or left, as shown by the double arrow. The light emitted from the exit units 6—one of which is shown schematically and similar to FIG. 2c—is emitted from a final exit window 12' closing off the respective housing 6.

Various changes and modifications may be made to features described in connection with any one of the embodiments may be used with any of the others, within the scope of the inventive concept.

Figure 2D:
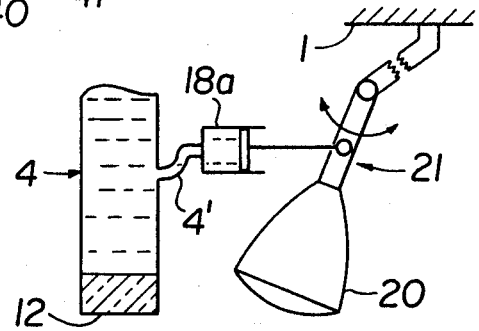
FIG. 2d is a schematic arrangement of a light guide functioning as a hydraulic servo positioning transmitter.

It is not necessary that the positioned system be an optical element which is in light transmitting relation to the end window 12 of the tube 4. Thus, any light receiving device, such as a mirror, or reflector, could also be positioned; other elements and devices, likewise, can be positioned as a function of the pressure within tube 4. FIG. 2d illustrates an arrangement in which a separate light source 20, for example an operating room light or a flood light arrangement, which has a movable suspension 21, is positioned relative to the position of the tube 4 by a cylinder-and-piston arrangement 18a coupled to the interior of the tube 4 by a branch 4'. Upon varying the pressure within tube 4—for example by a system similar to that of FIG. 3—the piston within the cylinder-and-piston arrangement 18a will move back and forth, being returned, for example, under spring pressure, as well known. Thus, light from the source 20, which, for example, can be an operating room light fixture and providing general area illumination, can be positioned relative to a specific light, for example to obtain spot-light effects emanating from the window 12 of tube 4; the tube 4, which could be moved independently of the light 20, as indicated schematically by the looped connecting line 4', can thus be used for the dual function of providing spot-lighting, ultraviolet or infrared light at selected locations while, simultaneously, performing the transmission elements for a hydraulic-mechanical positioning system, schematically shown as cylinder-piston arrangement 18a.

We claim:

1. Light directing and control system, particularly for medical operating and diagnostic use, comprising
   a hollow light guide (4) having an opaque, flexible tube (40);
   a light transmitting liquid (41) within said tube;

light generating means (2, 3) positioned at one end of the tube in light transmitting relation to the liquid therein;

a light emitting terminal (6) located at the other end of the tube;

controllable fluid pressure generating means (19, 20, 21, 22) in fluid communication with the light transmitting fluid within the tube;

a fluid pressure-controllable optical system (8, 9, 10; 11; 15, 16, 17) in light communication with the other end of the tube;

and pressure sensing and transducing means (8, 9, 10; 11, 18, 18') in fluid communication (4') with the light transmitting fluid of the tube, positioned adjacent said other end of the tube and controlling the optical system in accordance with the pressure within the tube to control the transmission of light through said optical system as a function of fluid pressure in the hollow light guide.

2. System according to claim 1, wherein the controllable fluid pressure generating means comprises controllable pump means (20, 21) connected in fluid communication to the light guide.

3. System according to claim 1, wherein the pressure sensing and transducing means comprises cylinder-piston means (18,18') in fluid communication with the light transmitting liquid (41) in said tube and providing a mechanical output, said mechanical output being coupled to the optical system to vary the transmission of light therethrough.

4. System according to claim 1, wherein (FIG. 2b) the optical system comprises a liquid lens (11) in fluid communication with the light transmitting liquid (41) within said tube (24).

5. System according to claim 1, wherein (FIG. 2c) the optical system comprises a variable aperture (16).

6. System according to claim 5, wherein the optical system further comprises a lens having a focal point which is variable with respect to the aperture, the position of the focal point of the lens being controlled by the pressure of the light transmitting liquid within the hollow light guide.

7. System according to claim 1, wherein the optical system comprises a liquid lens (11) including a flexible hollow, light transmissive membrane in fluid communication with the light transmitting liquid within the flexible tube (40), changes in pressure of the light transmitting liquid within the flexible tube distending, or collapsing the membrane and thereby changing the focal length of said liquid lens.

8. System according to claim 1, wherein (FIG. 2a) the optical system comprises a dispersion lens (8,9) forming the other end of said tube.

9. System according to claim 1, wherein the optical system comprises a lens system in essential alignment with the other end of the tube;

a fixed light transmissive window (12) closing off said tube;

a hydraulic-mechanical actuating means in fluid communication with the light transmitting liquid (41) within said tube (40) and in mechanical linkage communication to at least one lens of the lens system to vary the position of the lens with respect to the optical window (12).

10. System according to claim 9, wherein the lens system comprises a plurality of lenses;

and the hydraulic-mechanical transmission system is connected to the lenses to change the position of the lenses relative to each other.

11. System according to claim 1, wherein a plurality of light guides (4) are provided, each having a controllable optical system;

said fluid pressure generating means being in common fluid communication with said light guides to synchronously control the light transmission characteristics of the plurality of optical systems coupled to respective light guides.

12. Light directing control and positioning system comprising a hollow light guide (4) having an opaque, flexible tube (40) and a light transmitting liquid (41) within said tube;

light generating means (2, 3) positioned at one end of the tube in light transmitting relation to the liquid therein;

a light emitting terminal (12) located at the end of the tube;

a positioning system (20, 21) having a positionable element capable of movement between terminal positions;

controllable fluid pressure generating means (19, 20) in fluid communication with the light transmitting fluid (41) in said tube (40);

and pressure-mechanical movement sensing and transducing means (18, 18', 18a) in fluid communication with the light transmitting fluid in the tube and mechanically linked to the element to be positioned, and transducing changes in pressure of the light transmitting fluid, as commanded by the controllable fluid pressure generating means into mechanical movement to position the element in dependence on the pressure being applied to said light transmitting liquid.

13. System according to claim 12, wherein the element to be positioned comprises a light source (20) to control the direction of light being emitted by said source relative to the light emanating from the light emitting terminal at the end of said tube.

14. System according to claim 12, wherein the element to be positioned comprises at least part of an adjustable optical system positioned in light receiving relation to the light emitting terminal at the other end of the tube.

15. System according to claim 13, wherein said light source comprises an operating room light.

* * * * *